United States Patent [19]

Takahara et al.

[11] Patent Number: 4,885,490
[45] Date of Patent: Dec. 5, 1989

[54] NON-CONTACT POSITIONING DEVICE

[75] Inventors: Kenichi Takahara; Hiroshi Takahashi, both of Tokyo, Japan

[73] Assignee: Kabushiki Kaisha Toshiba, Kawasaki, Japan

[21] Appl. No.: 244,660

[22] Filed: Sep. 15, 1988

Related U.S. Application Data

[63] Continuation of Ser. No. 6,428, Jan. 23, 1987, abandoned.

[30] Foreign Application Priority Data

Jan. 24, 1986 [JP]  Japan .................................. 61-12059

[51] Int. Cl.$^4$ ............................................. F16C 39/06
[52] U.S. Cl. ................................... 310/90.5; 324/208; 350/DIG. 3; 378/132
[58] Field of Search ............. 73/178 R; 350/537, 543, 350/544, DIG. 3; 324/208; 378/125, 126, 132, 144; 310/90.5

[56] References Cited

U.S. PATENT DOCUMENTS

| | | |
|---|---|---|
| 4,088,018 | 9/1979 | Anderson et al. |
| 4,156,548 | 5/1979 | Anderson ........................ 310/90.5 |
| 4,583,794 | 4/1986 | Takahara et al. ............... 310/90.5 |
| 4,585,282 | 4/1986 | Bosley ............................. 310/90.5 |
| 4,644,205 | 2/1987 | Sudo et al. ...................... 310/90.5 |

OTHER PUBLICATIONS

22nd Aerospace Mechanisms Symposium; Nasa Langley Research Center; Hampton, VA; 05/4–6/88; Development of a Magnetically–Suspended, Tetrahedrom Shaped Antenna Pointing System; K. Takahara et al.
The 28th Japan Society for Aeronautical and Space Sciences No. ZD8; Inoue et al.; Oct. 1984.
Japan Society for Aeronautical and Space Sciences, proceedings of 16th Annual Meeting (in Japanese) No. ZB16; Sugiura et al.; Apr. 85.

Primary Examiner—R. S. Skudy
Attorney, Agent, or Firm—Oblon, Spivak, McClelland, Maier & Neustadt

[57] ABSTRACT

The non-contact positioning device is composed of a driven body formed by a magnetic substance which is the subject of positioning, and driving means constructed with electromagnets which support the driven body without contact. The driven body is formed as a simple polyhedron. The electromagnets are arranged facing each of the multiple faces of the simple polyhedron. This non-contact positioning device is constructed to adjust the position of the simple polyhedron by controlling the supply of current to the electromagnets.

18 Claims, 22 Drawing Sheets

NON-CONTACT POSITIONING DEVICE

This application is a continuation of application Ser. No. 006,428 filed on Jan. 23, 1987, now abandoned.

BACKGROUND OF THE INVENTION

1. Field of the Invention

This invention concerns a non-contact positioning device which adjusts the position of a driven body by using magnetic force to suspend it.

2. Discussion of Background

In the past, in positioning devices, there were limitations of degree-of freedom when driving. Therefore, when attempting to drive with more than 2 degrees-of freedom at the same time, it was general to use a combination of multiple drive units with fewer degrees-of-freedom. As driving methods for these types of positioning devices, either direct drive by drive sources such as linear motors and solenoids, or indirect drive methods via power transmission components such as gear-wheels and reduction gears were used. Also, the suspension of the drive body was carried out by oil bearings, ball-bearings, air bearings and springs.

However, these types of positioning devices had the following problems. Firstly, since they were composed of combinations of multiple drive units, the construction was complex and large numbers of parts were required. Production was therefore extremely difficult. Secondly, since friction occurred in all parts when driving, besides the emission of heat and fluctuation of output, they became unstable due to wear and it was difficult to ensure accuracy and reliability. Thirdly, since lubrication of the bearings which suspended the driven body was required, prolonged use became impossible in special environments such as the high vacuum of space.

As opposed to this, there are the types of device stated in U.S. Pat. Nos. 4156548 and 4088018. These were devised for the purpose of supporting telescopes in space-craft in isolation from the space-craft's vibration and for correcting the telescopes' optical axes, and discs were supported from their outer perimeter by 6 sets (12) of electromagnets. A 5 degree-of-freedom drive was thus achieved.

However, since in this type of prior device, 2 electromagnets were required for a 1 degree-of-freedom drive, when positioning using a multi-degree-of freedom drive, large numbers of electromagnets had to be used. Moreover, it was necessary to design electromagnets suitable for the respective degrees-of-freedom, and since their shapes and sizes differed, there were problems with difficulty in the arrangement of the electromagnets and complexity of construction.

OBJECT OF THE INVENTION

This invention was devised in the light of problems in prior designs. Its purpose is to provide a non-contact positioning device with easier assembly and parts control by standardising shapes and sizes of electromagnets and, at the same time, to improve reliability of operation by designing a reduction in the numbers of electromagnets used.

SUMMARY OF THE INVENTION

In order to achieve the purpose of this invention, a non-contact positioning device is composed of a driven body formed by a magnetic substance which is the subject of positioning, and driven electromagnets which support the driven body without contact. The driven body is formed as a simple polyhedron. The electromagnets are arranged facing each of the multiple faces of the simple polyhedron. This non-contact positioning device is constructed to adjust the position of the simple polyhedron by controlling the supply of current to the electromagnets.

As is clear from the above explanation, by applying the construction of this invention:

(a) Since it has complete non-contact suspension and drive function, multi-degree-of-freedom positioning can be performed with a high degree of accuracy. Therefore, the friction which was a problem with prior mechanical systems can be eliminated, and furthermore, since no lubrication is required, the system can be used without any difficulty in a true vacuum, such as in space.

(b) Since a multi-degree-of-freedom positioning device can be constructed with a simpler construction and fewer parts, the accuracy and reliability of the positioning device can be improved.

(c) Since the driven body is a simple polyhedron, production can be made simple and easy.

(d) Standardisation of the shapes and sizes of the electromagnets installed in the driving body is simple.

(e) Furthermore, the number of electromagnets can be reduced from the prior requirement of 2 for each single degree-of-freedom to a minimum of 7 for 6 degrees-of-freedom.

DETAILED DESCRIPTION OF THE PREFERRED EMBODIMENTS

Some embodiments of this invention are described below, based on drawings.

Figure 1:
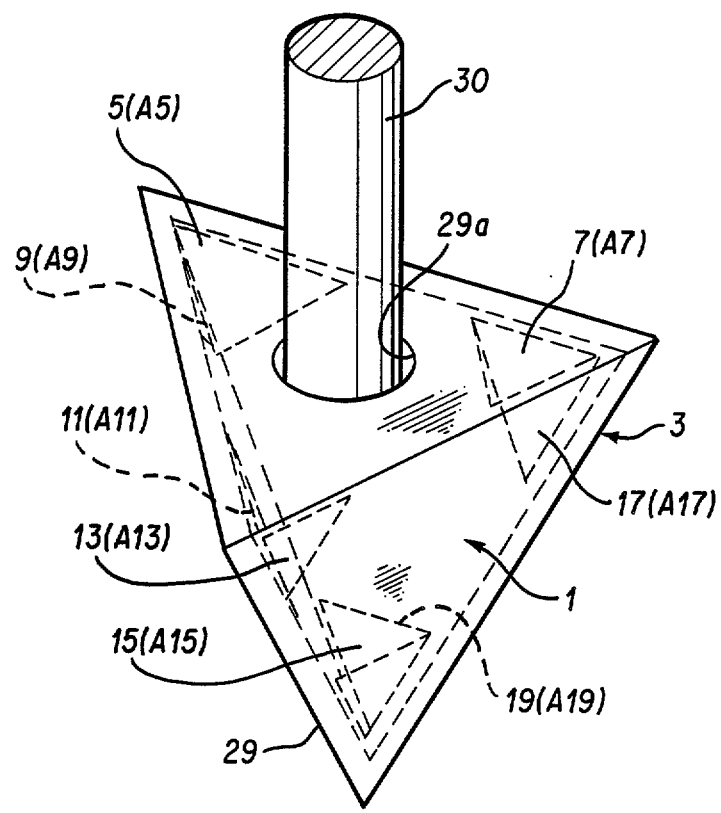
FIG. 1 is an overall oblique view showing the construction of the non-contact positioning device related to Embodiment 1 of this invention.

FIG. 1 is a whole oblique view showing the construction of the non-contact positioning device relating to Embodiment 1 of this invention. This non-contact positioning device is composed of driven body 1 formed from a simple polyhedron, for instance a regular tetrahedron, which is the subject to be positioned, and driving body 3 which drives driven body 1, causing it to be suspended without contact. The faces of the driving body and the faces of the driven body have the same shape.

8 electromagnets 5, 7, 9, 11, 13, 15, 17 and 19 are provided in driving body 3 having magnetic attraction for driven body 1, with a specified magnetic gap.

These electromagnets 5-19 are arranged with 2 electromagnets facing each corner or vertex of the outer faces of driven body 1 and arranged asymmetrically with respect to a perpendicular bisector of the face.

Figure 2:
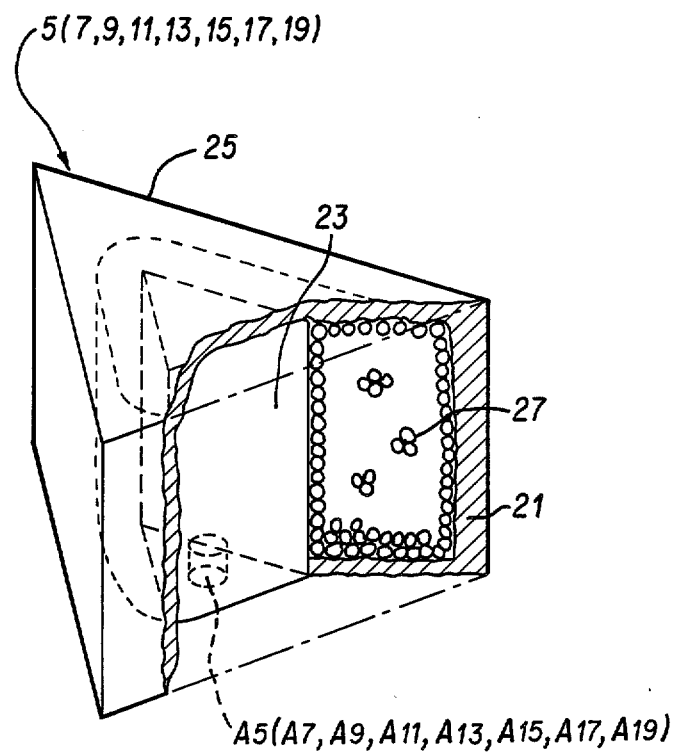
FIG. 2 is an oblique view of an electromagnet used in the non-contact positioning device in FIG. 1.

Electromagnets 5-19 are all formed with the same construction, for instance that shown in FIG. 2 in the shape of a triangular prism. That is to say, they are formed of ferromagnetic material and are composed of 2 magnetic pole-pieces 21 and 23 magnetically connected by connecting piece 25. Coil 27 is wound in the space between magnetic pole-piece 21 and magnetic pole-piece 23. Furthermore, position sensors $A_5-A_{19}$ are inset into each magnetic pole-piece 23 to detect the gap distances between magnetic pole-pieces 21 and 23 and driven body 1.

As shown in FIG. 1, these 8 electromagnets 5-19 are connected by connecting members 29 which are made of non-magnetic material. In other words, although not shown in the drawing, projecting bolts are incorporated in connecting pieces 25 (see FIG. 2) for electromagnets 5-19. These bolts pass through connecting member 29 and are secured with nuts, which are also not shown in the drawing.

Support 30 passes through hole 29a in connecting member 29 and is fixed in the centre of driven body 1, and communication antenna, etc., for example, are installed on its top end.

Figure 3:
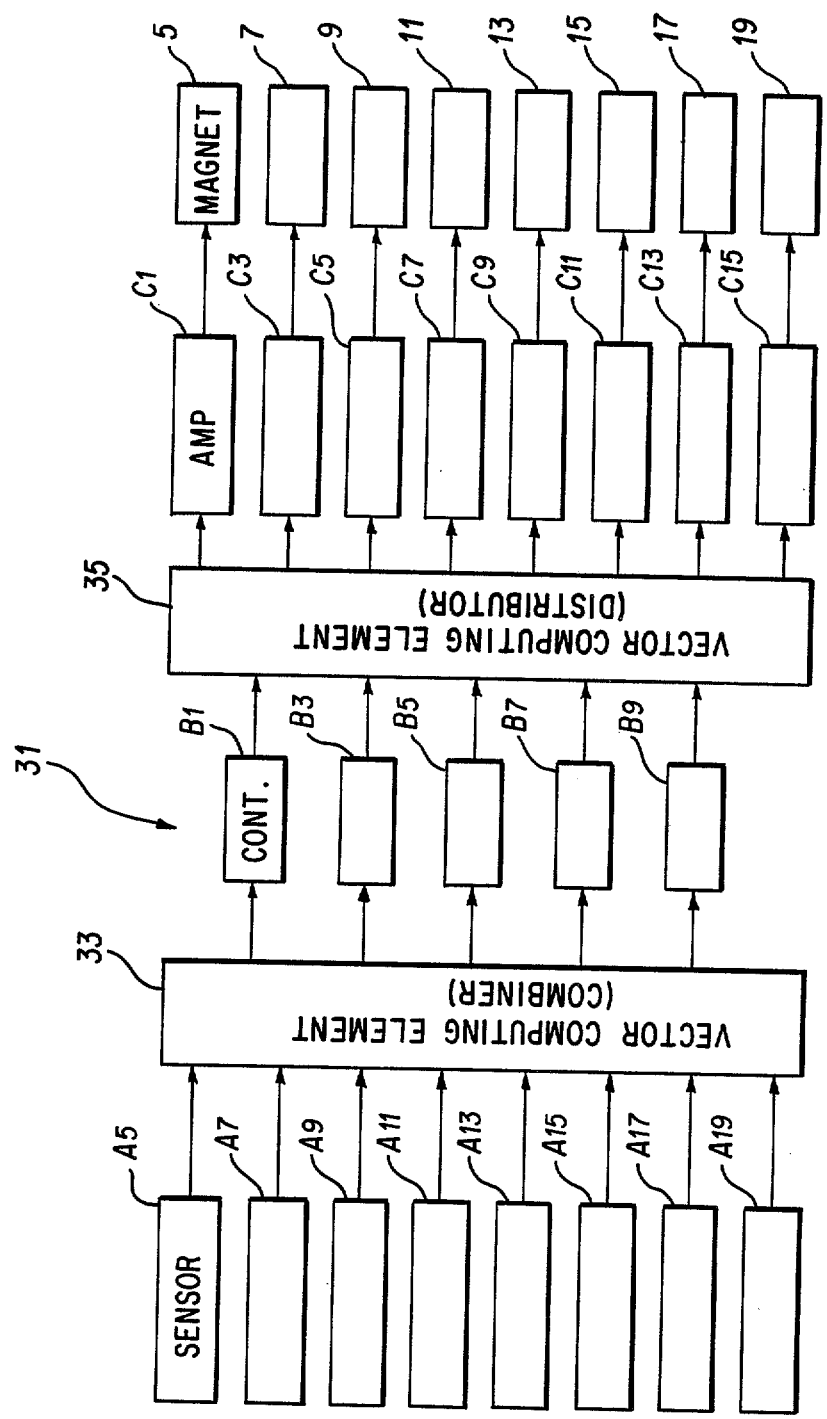
FIG. 3 is a block diagram of a position adjustment system.

The detection signals of position sensors $A_5-A_{19}$ are input to position adjustment system 31, shown in FIG. 3, which supplies current to electromagnets 5-19 and, by controlling this, adjusts the position of driven body 1. This position adjustment system 31 is provided with vector computing element (combiner) 33, controllers $B_1-B_9$, vector computing element (distributor) 35 and signal amplifiers $C_1-C_{15}$. Vector computing element 33 receives the detection signals from each position sensor $A_5-A_{19}$ fitted to each electromagnet 5-19 and carries out vector computation (combination) based on the directional displacement given to each electromagnet 5-19. It converts the vectors to a rectangular coordinate system and, at the same time, compares the external command signal for each axis with the control signals which have been converted to the rectangular coordinate system, and outputs the deviations. Controllers $B_1-B_9$ receive these deviations and compute the amounts of control in the rectangular coordinate system. Vector computing element 35 receives the amounts of control given by controllers $B_1-B_9$ and carries out vector computation (distribution) for the direction so each electromagnet 5-19. Signal amplifiers $C_1-C_{15}$ amplify the output signals from vector computing element 35 and output the amplified signals to each electromagnet 5-19.

Next, the operation of Embodiment 1 is explained with reference to FIGS. 4-6.

Figure 4:
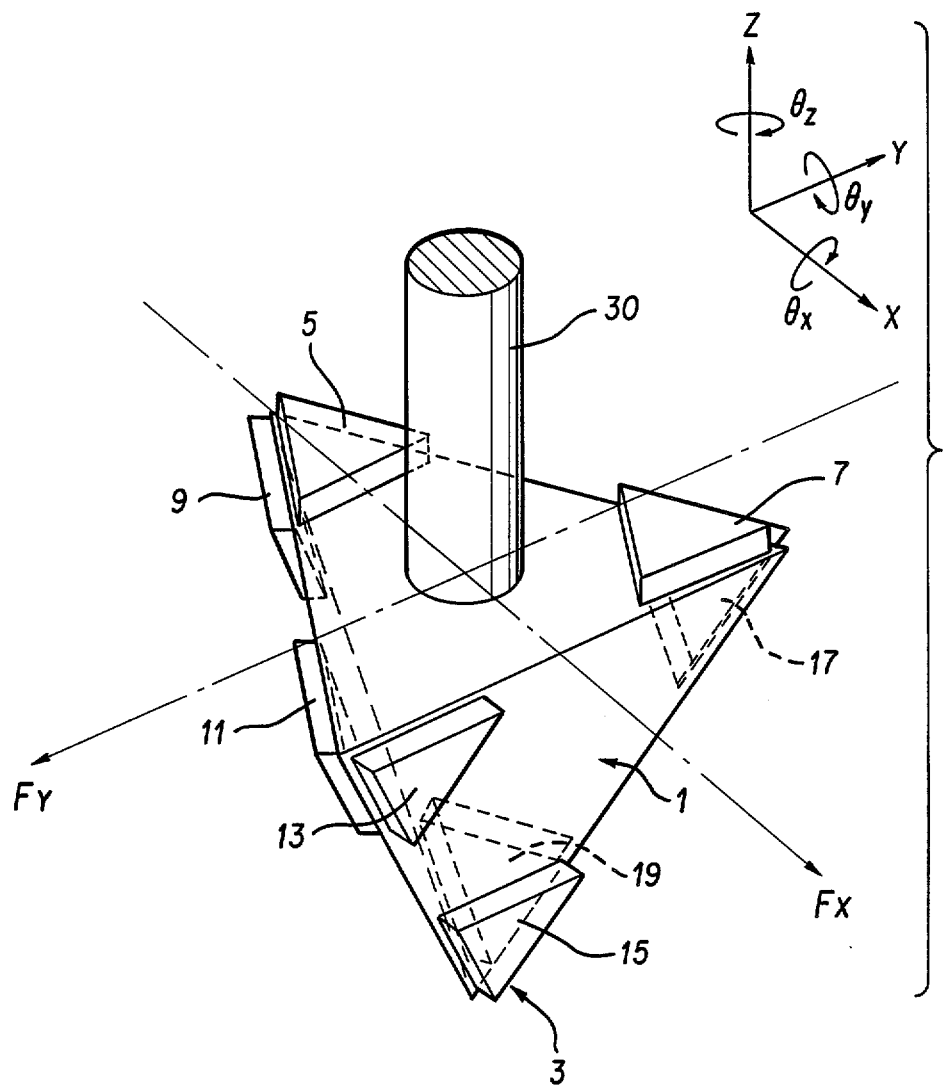
FIGS. 4–6 are illustrations of operation.

In FIG. 4, when the currents flowing in electromagnets 13 and 15 are increased by position adjustment system 31 shown in FIG. 3 and the currents flowing in the other electromagnets 5, 7, 9, 11, 17 and 19 are suitably increased or decreased, the magnetic force between electromagnets 13 and 15 and driven body 1 is intensified. Movement in directions other than the X axis which occurs due to this magnetic force is adjusted by the magnetic forces between the other electromagnets 5, 7, 9, 11, 17 and 19 and driven body 1, and so the entire driven body 1 moves in the direction of the arrow sign $F_x$ in the Figure.

In the same way, in FIG. 4, when the currents flowing in electromagnets 9 and 11 are increased by position adjustment system 31 and the currents flowing in the other electromagnets 5, 7, 13, 15, 17 and 19 are suitably increased or decreased, the magnetic force between electromagnets 9 and 11 and driven body 1 is intensified. Movement in directions other than the Y axis which occurs due to this magnetic force is adjusted by the magnetic forces between the other electromagnets 17 and 19 and driven body 1, and so the entire driven body 1 moves in the direction of the arrow sign $F_Y$ in the Figure.

Figure 5:
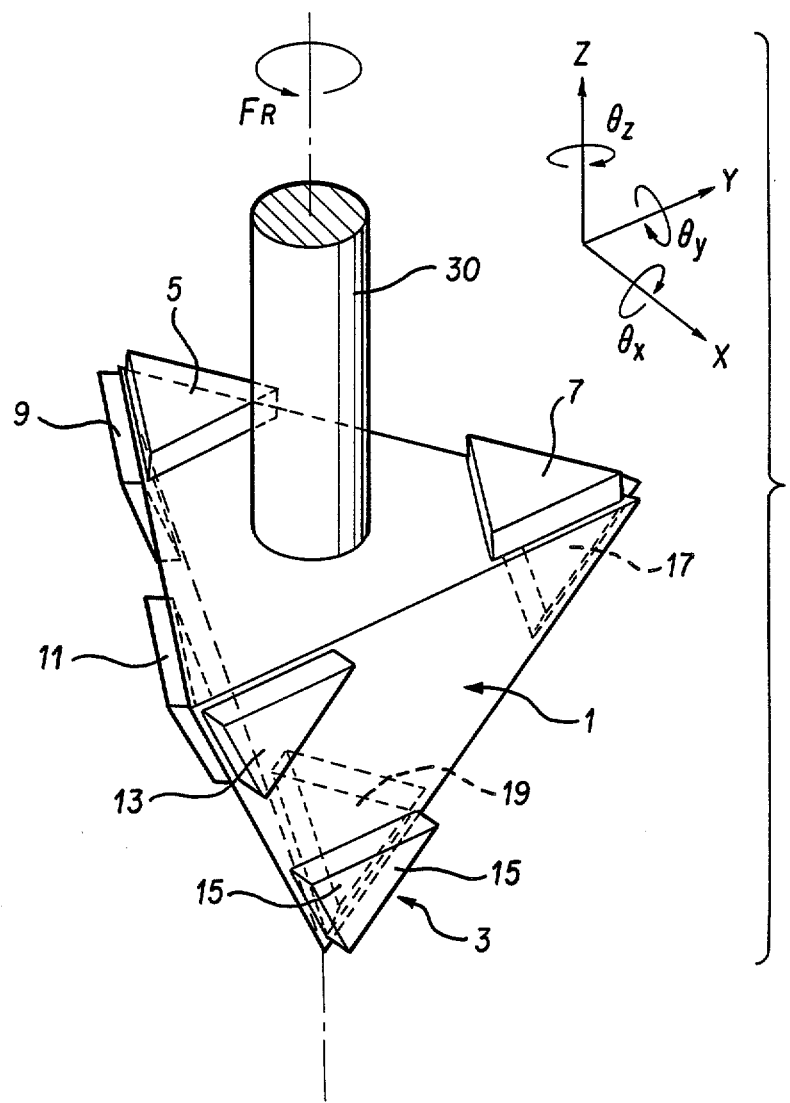

Moreover, as shown in FIG. 5, when the currents flowing in electromagnets 9 and 13 are increased by position adjustment system 31 and the currents flowing in the other electromagnets 5, 7, 11, 15, 17 and 19 are suitably increased or decreased, the magnetic force between electromagnets 9 and 13 and driven body 1 is intensified. Movement in directions other than the $\theta z$ axis which occurs due to this magnetic force is adjusted by the magnetic forces between the other electromagnets 5, 7, 11, 15, 17 and 19 and driven body 1, and so the entire driven body 1 rotates through a small angle in the direction of the arrow $F_R$ in the Figure.

Figure 6:
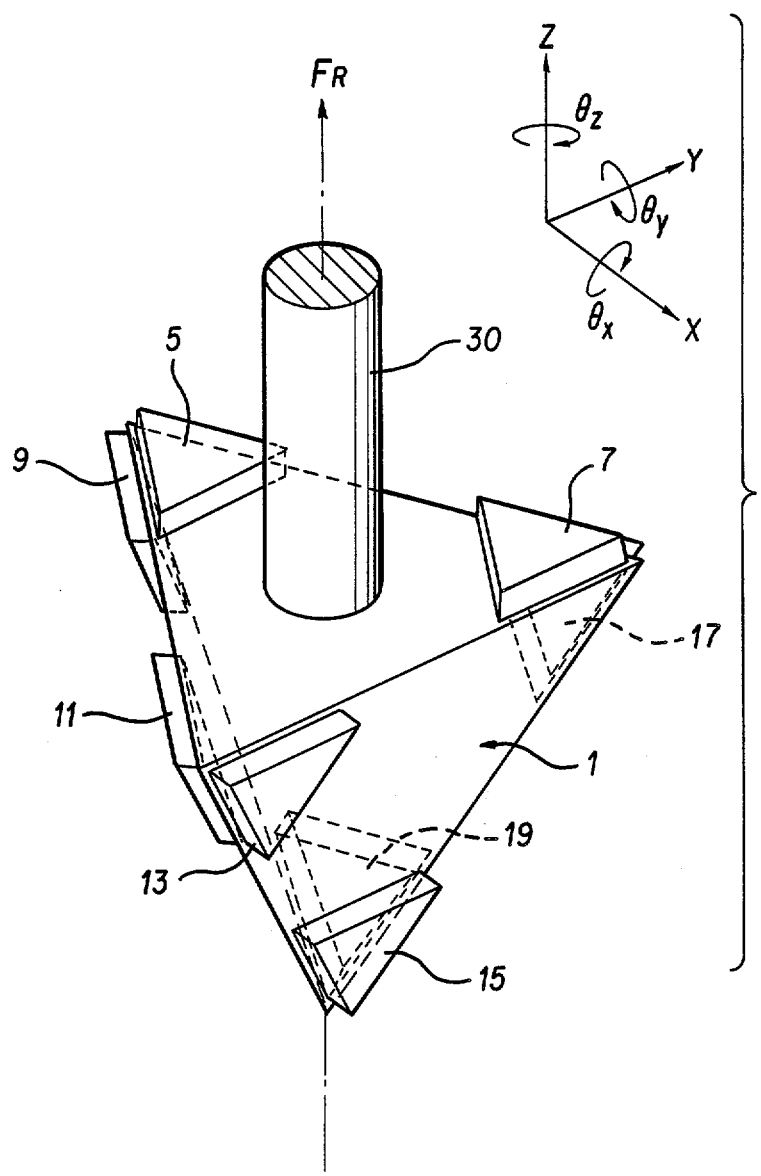

Furthermore, as shown in FIG. 6, when the currents flowing in electromagnets 5 and 7 are increased by position adjustment system 31 (see FIG. 3) and the currents flowing in the other electromagnets (9, 11, 13, 15, 17 and 19) are suitably increased or decreased, the magnetic force between electromagnets 5 and 7 and driven body 1 is intensified. Movement in directions other than the Z axis which occurs due to this magnetic force is adjusted by the magnetic forces between the other electromagnets 9, 11, 13, 15, 17 and 19 and driven body 1, and so the entire driven body 1 moves in the direction of the arrow sign $F_z$ in the Figure.

In this way, the non-contact positioning device relating to this Embodiment can suspend and position driven body 1 in a given position using 8 electromagnets 5-19 and 8 position sensors $A_5-A_{19}$ (see FIG. 2). Therefore, the position of the antenna, etc., fitted to support 30 on driven body 1 can be controlled and a highly accurate antenna pointing control device with multi-degree-of-freedom can be achieved.

Figure 7:
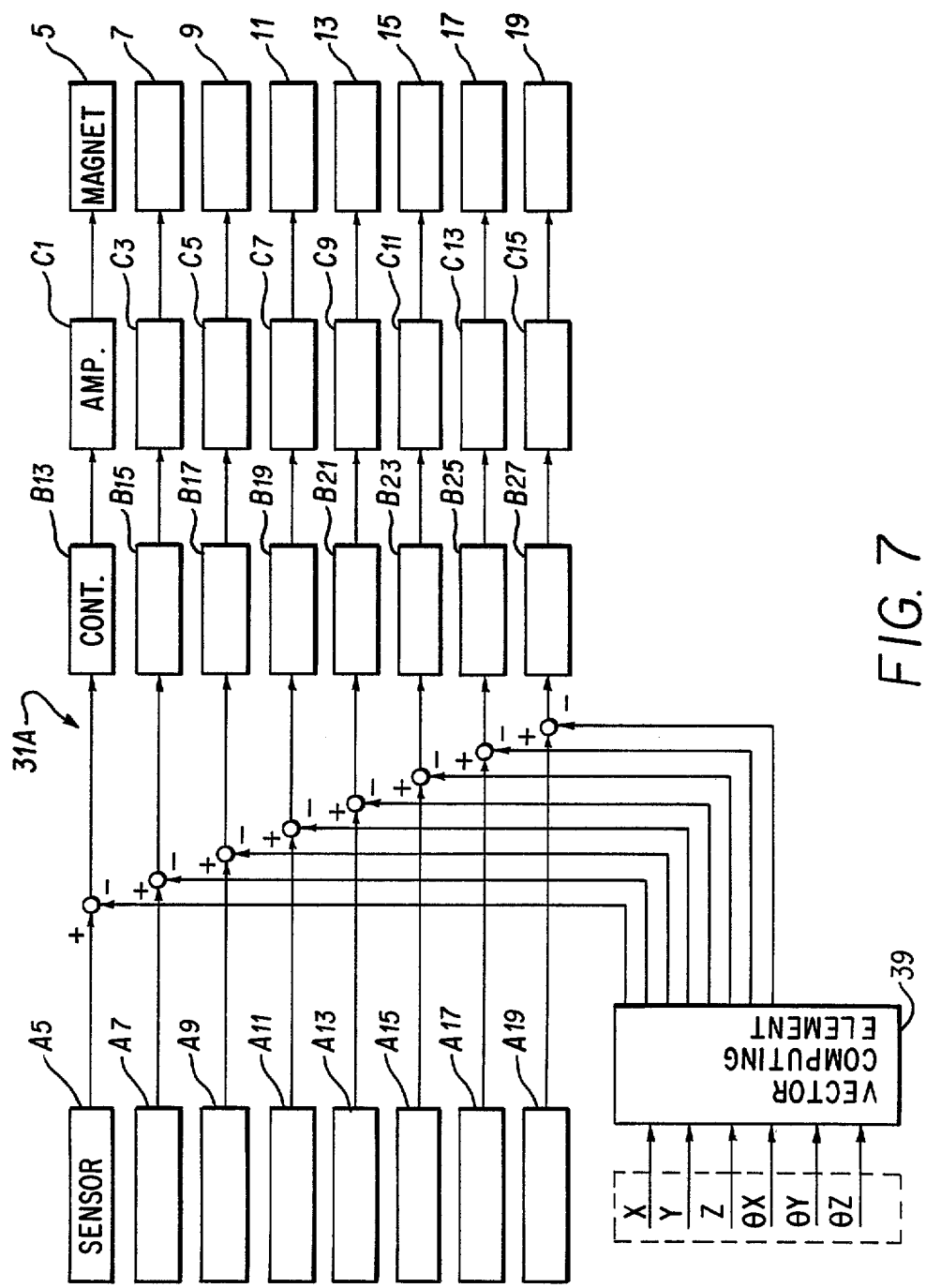
FIG. 7 is a block diagram of a position adjustment system for other Embodiments.

FIG. 7 is a block diagram showing another embodiment of the position adjustment system. Position adjustment system 31A which relates to this embodiment is a direct control system. That is to say, it is constructed so that the external command signals given by the rectangular coordinate system are distributed by vector computing element 39 as directional vectors for each of electromagnets 5-19. The deviations between these output signals from vector computing element 39 and the detection signals from each position sensor $A_5$-$A_{19}$ are input to each controller $B_{13}$-$B_{27}$. In each controller $B_{13}$-$B_{27}$, amounts of control corresponding to these deviations are computed and output. These control signals are amplified by signal amplifiers $C_1$-$C_{15}$ and the amplified signals are output to each of electromagnets 5-19.

Figure 8:
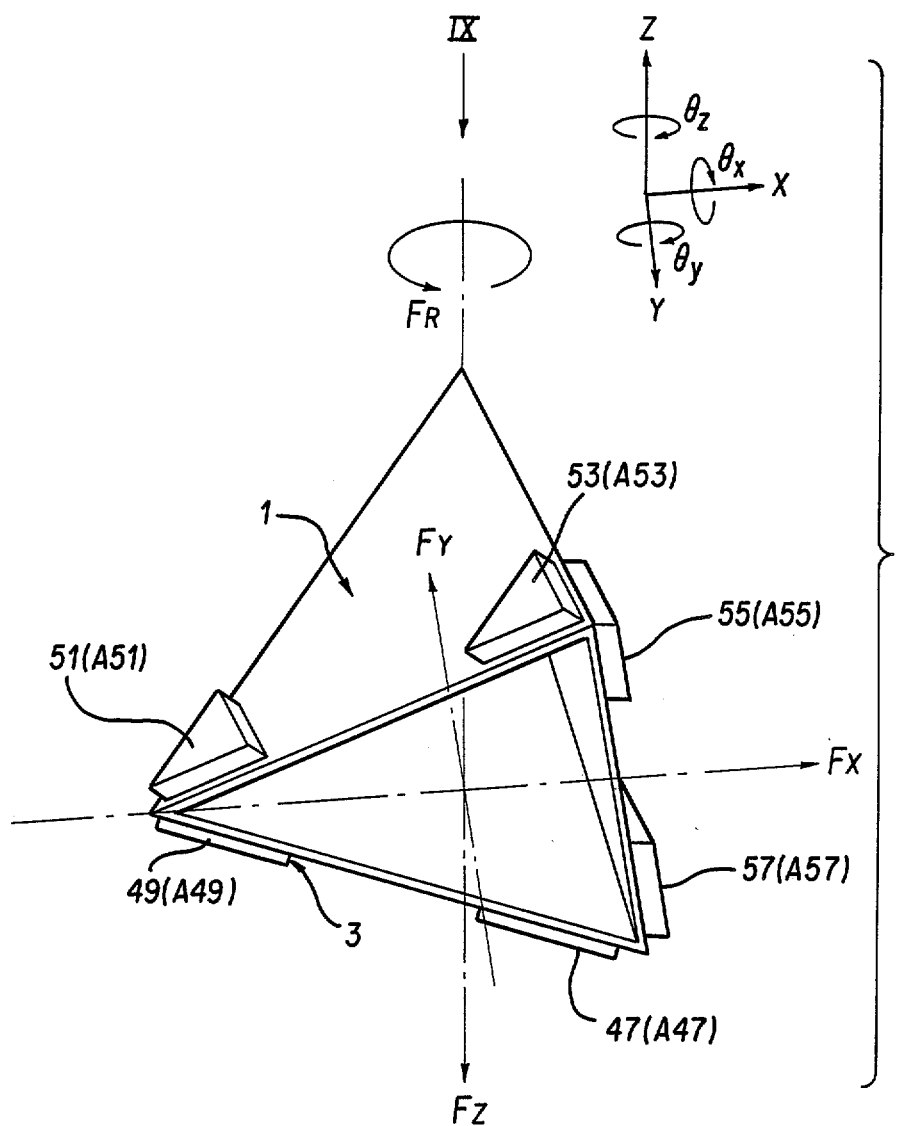
FIG. 8 is an overall oblique view showing the construction of the non-contact positioning device related to Embodiment 2 of this invention.
Figure 9:
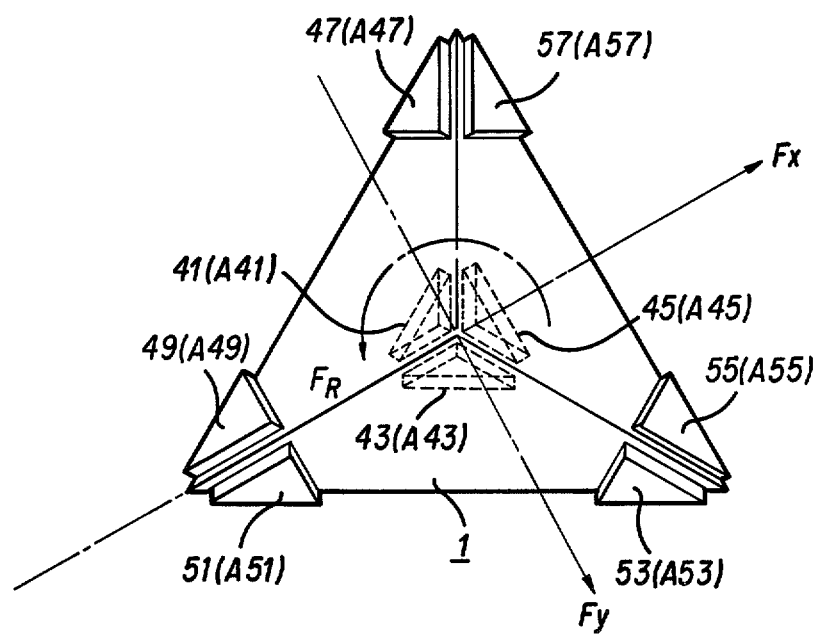
FIG. 9 is a view from arrow IX in FIG. 8.

FIGS. 8 and 9 show Embodiment 2 of this invention. As shown in FIGS. 8 and 9, this Embodiment is composed of 9 electromagnets 41-57 and 9 position sensors $A_{41}$-$A_{57}$ installed on driving body 3 which suspend and drive without contact driven body 1 formed as a heptahedron which is the subject of positioning. The heptahedron of driven body 1 shows one example of the simple polyhedron in the Claim. The 3 inside faces of a hollow regular tetrahedron of which one face is open are also each respectively counted as a face. Electromagnets 41-57 and position sensors $A_{41}$-$A_{57}$ are constructed in the same way as in Embodiment 1. 3 electromagnets 41, 43 and 45 are each arranged facing the vertex of the 3 inner faces of driven body 1 with specified gaps between them and it. Two each of the 6 electromagnets 47, 49, 51, 53, 55 and 57 are arranged facing the bottom edges of the 3 outer faces of driven body 1 with specified gaps between them and it. These electromagnets are connected by connecting members which are not shown in the Figure.

Next, the operation of Embodiment 2 is explained.

In FIGS. 8 and 9, when the currents flowing in electromagnets 41, 43, 55 and 57 are increased by position adjustment system 31 or 31A and the currents flowing in the other electromagnets 45, 47, 49, 51, and 53 are suitably increased or decreased, the magnetic force between electromagnets 41, 43, 55 and 57 are driven body 1 is intensified. Movement in directions other than the X axis which occurs due to this magnetic force is adjusted by the magnetic forces between the other electromagnets 45, 47, 49, 51, and 53 and driven body 1, and so the entire driven body 1 moves in the direction of the arrow sign $F_x$ in the Figure.

In the same way, when the currents flowing in electromagnets 41, 45, 51 and 53 are increased and the currents flowing in the other electromagnets 43, 47, 49, 55, and 57 are suitably increased or decreased, the magnetic force between electromagnets 41, 45, 51 and 53 and driven body 1 is intensified. Movement in directions other than the Y axis which occurs due to this magnetic force is adjusted by the magnetic forces between the other electromagnets 43, 47, 49, 55, and 57 and driven body 1, and so the entire driven body 1 moves in the directions of the arrow sign $F_Y$ in the Figure.

Also, when the currents flowing in electromagnets 47, 51 and 55 are increased and the currents flowing in the other electromagnets 41, 43, 45, 49, 53, and 57 are suitably increased or decreased, the magnetic force between electromagnets 47, 51 and 55 and driven body 1 is intensified. Movement in directions other than the $\theta_z$ axis which occurs due to this magnetic force is adjusted by the magnetic force between the other electromagnets 41, 43, 45, 49, 53, and 57 and driven body 1, and so the entire driven body 1 rotates in the direction of the arrow sign $F_R$ in the Figure.

Furthermore, when the currents flowing in electromagnets 41, 43, and 45 are increased and the currents flowing in the other electromagnets 47, 49, 51, 53, 55, and 57 are decreased, the magnetic force between electromagnets 41, 43, and 45, and driven body 1 is intensified and the magnetic forces between the other electromagnets 47, 49, 51, 53, 55, and 57 and driven body 1 are weakened, and so the entire driven body 1 moves in the direction of the arrow sign $F_z$ in the Figure.

Thus, in the Embodiment, by using 9 electromagnets 41-57 and 9 position sensors $A_{41}$-$A_{57}$, the suspension of driven body 1 in any given position can be achieved.

Also, since electromagnets 41, 43 and 45 are arranged inside driven body 1, leakage of magnetic flux to the outside of driven body 1 is small and, furthermore, since the construction utilises the space inside driven body 1, the device as a whole can be made more compact.

Moreover, construction can also be by arranging electromagnets 41, 43 and 45 outside driven body 1 and arranging the other electromagnets 47, 49, 51, 53, 55 and 57 inside driven body 1.

Figure 10:
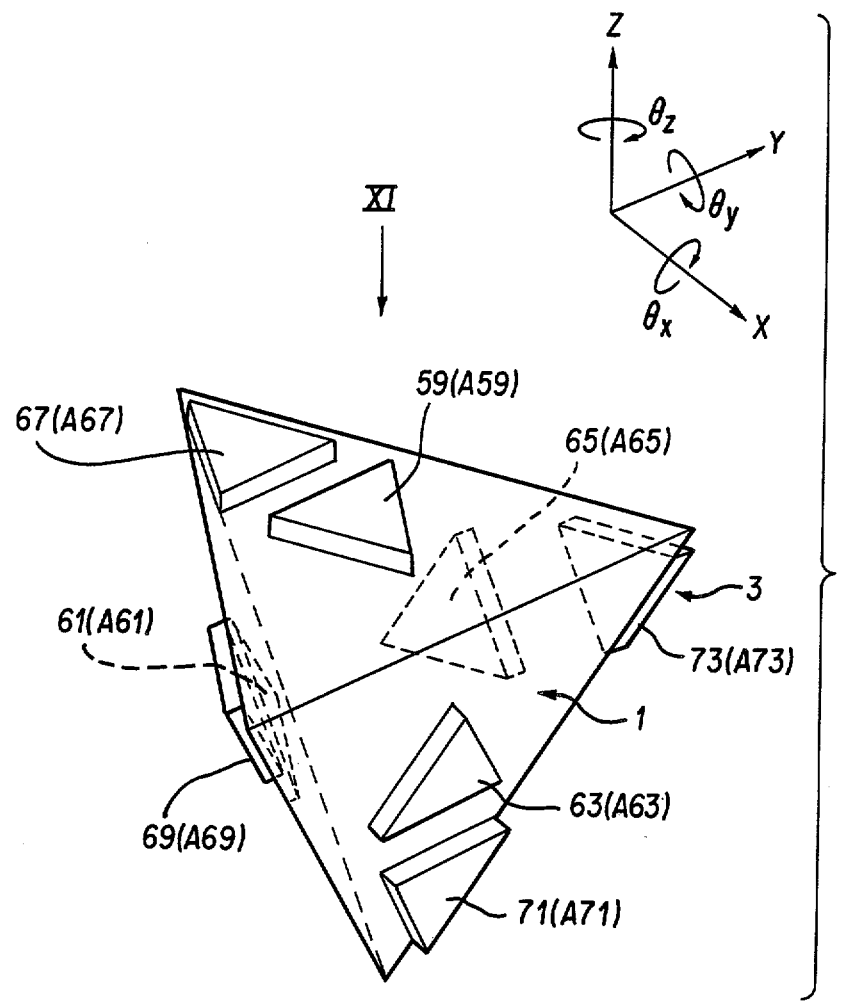
FIG. 10 is an overall oblique view showing the construction of the non-contact positioning device related to Embodiment 3 of this invention.
Figure 11:
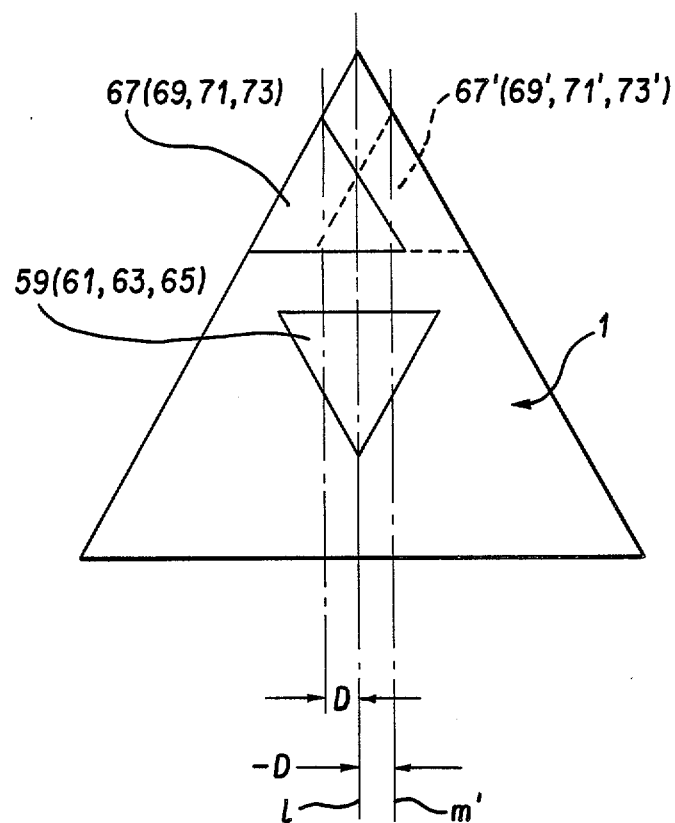
FIG. 11 is a view from arrow XI in FIG. 10.

FIGS. 10 and 11 show Embodiment 3 of this invention. In this Embodiment, as shown in FIG. 10, 8 electromagnets 59-73 and 8 position sensors $A_{59}$-$A_{73}$ are fitted on driving body 3 which suspends and drives without contact driven body 1 formed as a tetrahedon which is the subject of positioning. Electromagnets 59-73 and position sensors $A_{59}$-$A_{73}$ are constructed in the same way as in Embodiment 1. Of the 8 electromagnets 59-73, 4 electromagnets 59, 61, 63 and 65 are arranged facing the positions of the centers of gravity of each of the faces of driven body 1 and drive driven body 1 in translation. 4 electromagnets 67, 69, 71 and 73 are each arranged facing 1 corner of each face of driven body 1 and drive driven body 1 in rotation. As shown in FIG. 11, electromagnets 67, 69, 71 and 73 which drive driven body 1 in rotation are respectively arranged with their centers on straight lines m having deviation D or on straight lines m' having deviation $-D$ from the perpendiculars 1 of each face of driven body 1. Therefore, approximately the same movement effect as in Embodiment 1 can be expected.

Figure 12:
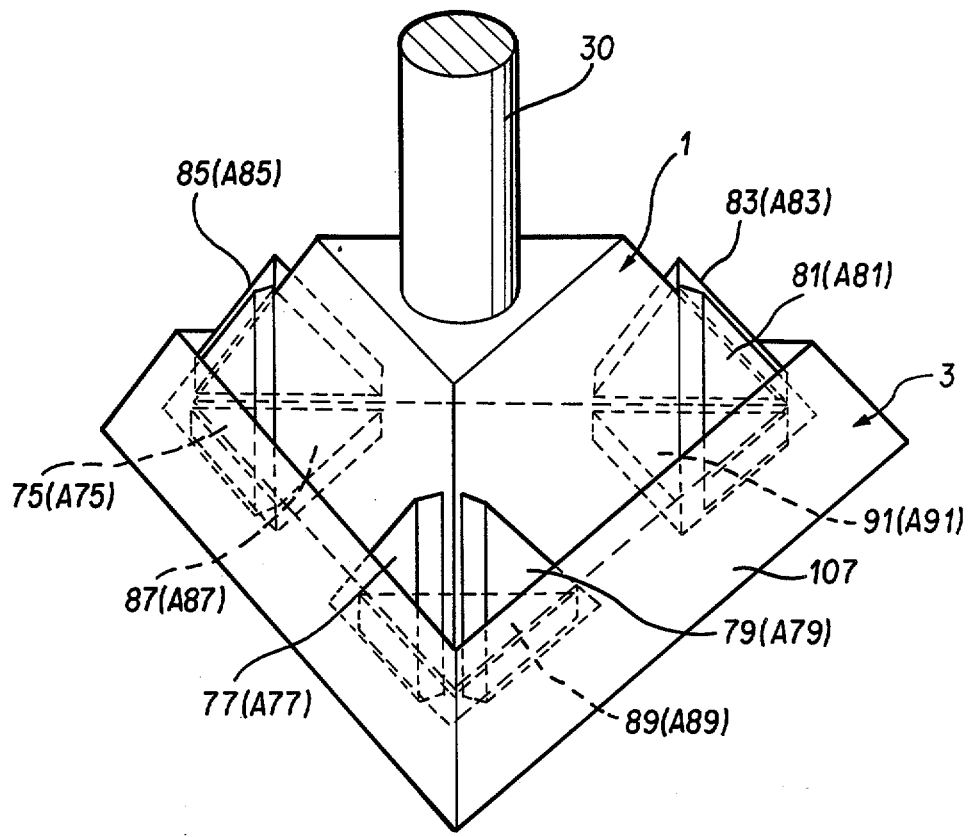
FIG. 12 is an overall oblique view showing the construction of the non-contact postioning device related to Embodiment 4 of this invention.

FIG. 12 shows Embodiment 4 of this invention and driven body 1 has a shape like a decapitated pentahedron, with driving body 3 arranged facing the lower part of driven body 1.

In driving body 3, 9 electromagnets 75, 77, 79, 81, 83, 85, 87, 89 and 91 are provided which have magnetic attraction for, and with a specified magnetic gap from, driven body 1. Of these 9 electromagnets 75-91, 6 electromagnets 75, 77, 79, 81, 83 and 85 are arranged with 2 corresponding to each of 3 faces of driven body 1. 3 electromagnets 87, 89 and 91 are arranged corresponding to the remaining 1 face of driven body 1.

Figure 13:
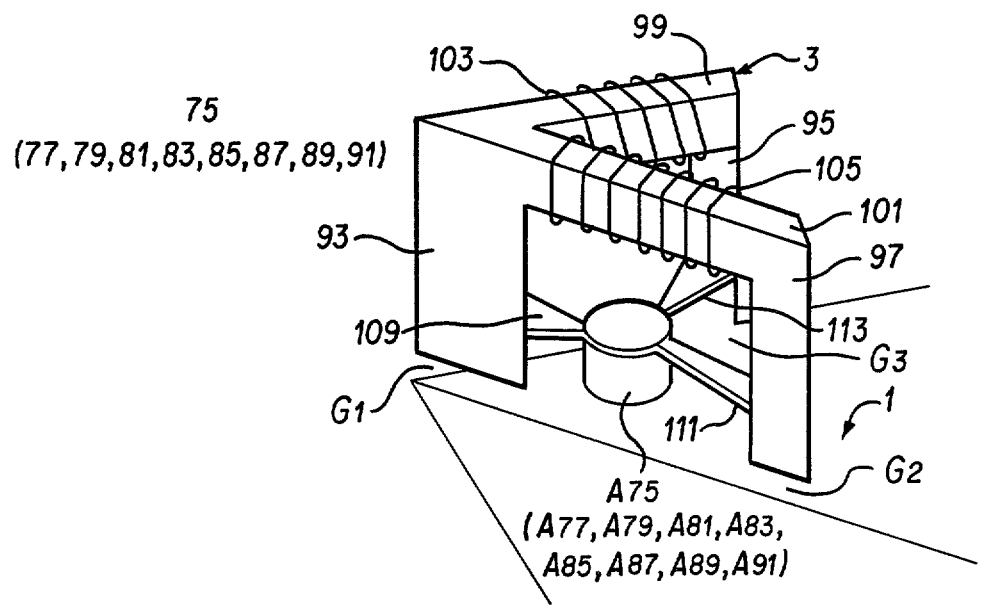
FIG. 13 is an oblique view of an electromagnet used in the non-contact positioning device in FIG. 12.
Figure 14:
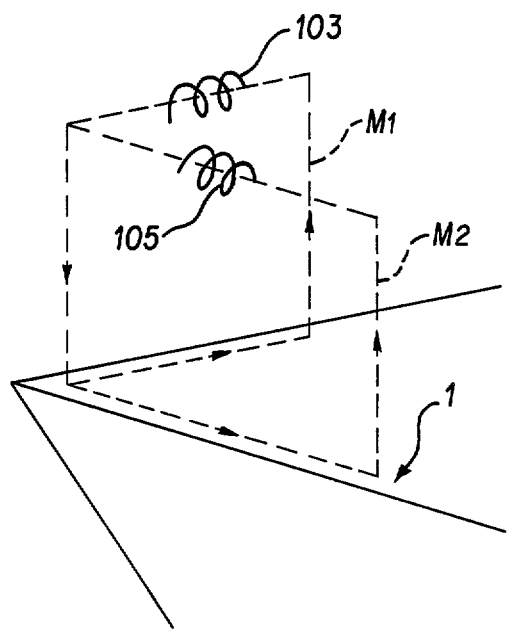
FIG. 14 is a diagram showing the magnetic circuit of an electromagnet.

Electromagnets 75-91 are constructed with the same construction as shown in, for example, FIG. 13. In other words, they are formed of ferromagnetic material from 3 magnetic pole-pieces 93, 95 and 97 and connecting pieces 99 and 101 which magnetically connect pole-pieces 93, 95 and 97. Coils 103 and 105 are wound round connecting pieces 99 and 101. When a suitable current flows through coils 103 and 105, magnetic closed loop $M_1$ forms passing through gaps $G_1$ and $G_3$ between magnetic pole-piece 93, connecting piece 99 and magnetic pole-piece 95 and driven body 1. At the same time, magnetic closed loop $M_2$ is formed passing through gaps $G_2$ and $G_1$ between magnetic pole-piece 93, connecting piece 101 and magnetic pole-piece 97 and driven body 1.

Driving body 3 is constructed by connecting the 9 electromagnets 75–91 which have this type of magnetic loop $M_1$ and $M_2$. This is done by, for example, connecting bolts (not shown in the Figure) projecting from connecting pieces 99 and 101 which pass through connecting member 107 made of non-magnetic material and are secured by nuts (not shown in the Figure). Driven body 1 is suspended without contact in relation to driving body 3 by the magnetic forces generated by magnetic loops $M_1$ and $M_2$ of electromagnets 75–91.

Also, position sensors $A_{75}$–$A_{91}$ are installed on electromagnets 75–91. These position sensors $A_{75}$–$A_{91}$ detect the gap distances from magnetic pole-pieces 93, 95 and 97 to driven body 1, and they are arranged between magnetic pole-pieces 93, 95 and 97 in supporting members 109, 111 and 113.

The detection signals of position sensors $A_{75}$–$A_{91}$ are input to position adjustment system 31 which adjusts the position of driven body 1 by supplying and controlling currents to each of electromagnets 75–91.

Figure 15:
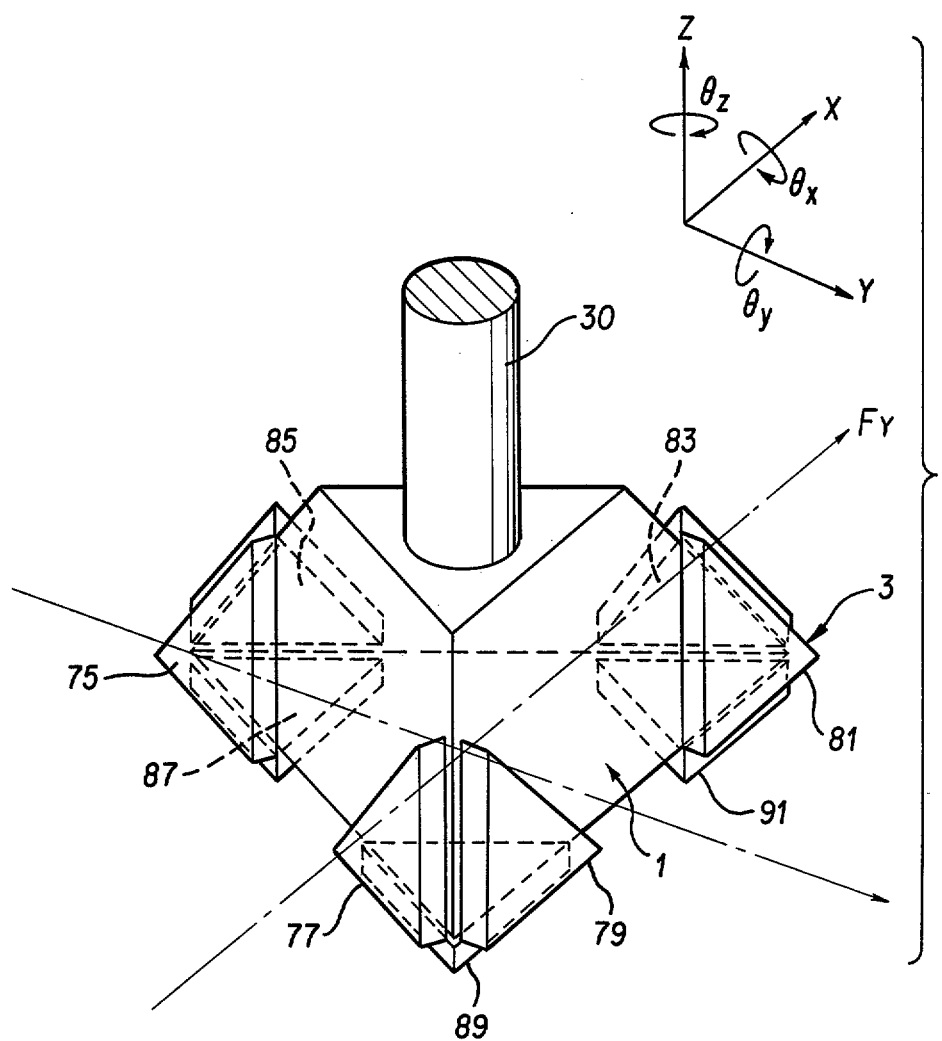
FIGS. 15–17 are illustrations of operation.
Figure 16:
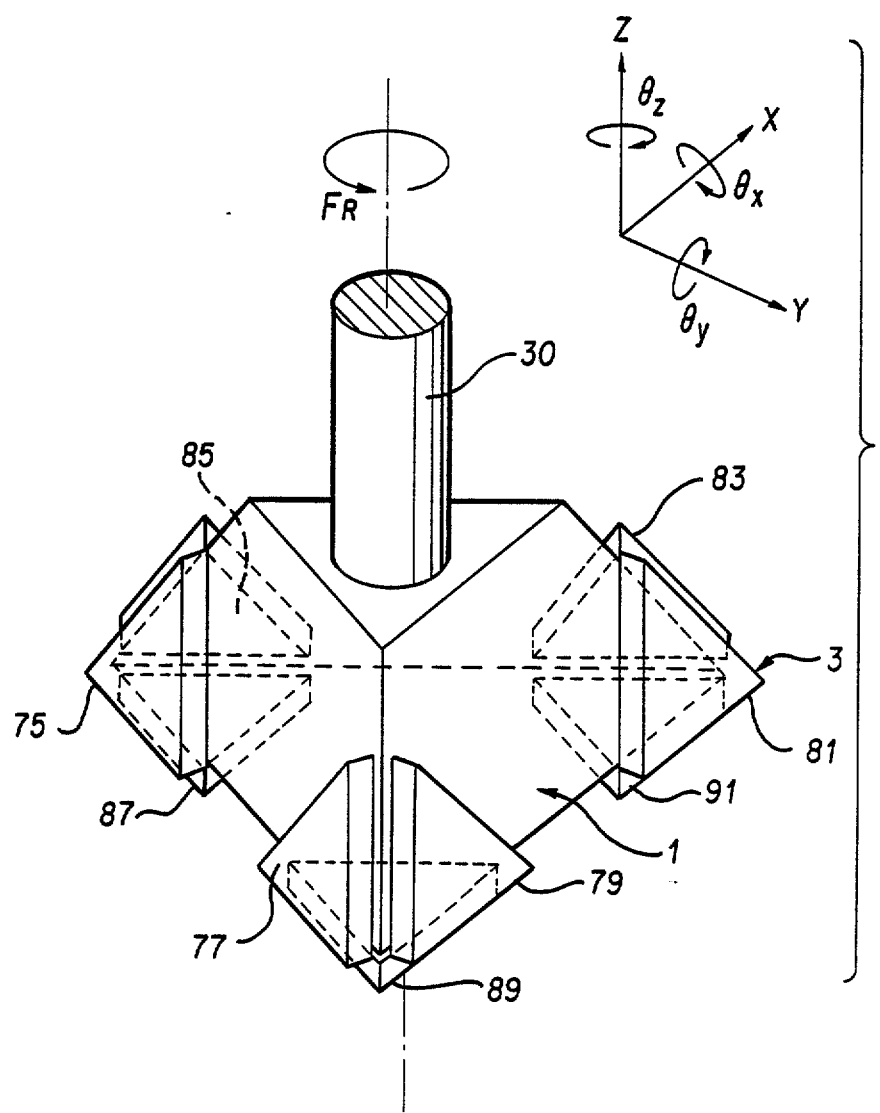
Figure 17:
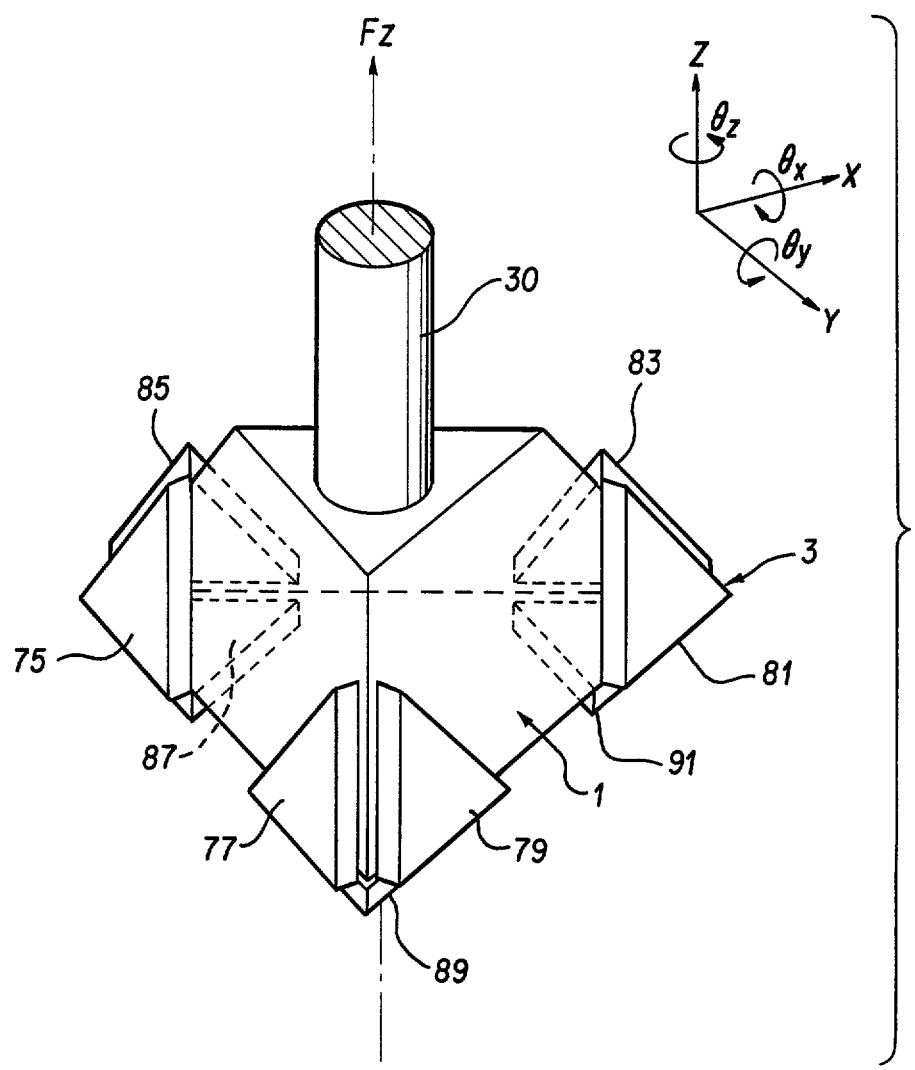

Next, the operation of Embodiment 4 is explained based on FIGS. 15–17.

In FIG. 15, when the currents flowing in electromagnets 79 and 81 are increased by position adjustment system 31 and the currents flowing in the other electromagnets 75, 77, 83, 85, 87, 89 and 91 are suitably increased or decreased, the magnetic force between electromagnets 79 and 81 and driven body 1 is intensified. Movement in directions other than the X axis which occurs due to this magnetic force is adjusted by the magnetic forces between the other electromagnets 75, 77, 83, 85, 87, 89 and 91 and driven body 1, and so the entire driven body 1 moves in the direction of the arrow sign $F_x$ in the Figure.

Similarly, in FIG. 15, when the currents flowing in electromagnets 83 and 85 are increased by position adjustment system 31 and the currents flowing in the other electromagnets 75, 77, 79, 81, 87, 89 and 91 are suitably increased or decreased, the magnetic force between electromagnets 83 and 85 and driven body 1 is intensified. Movement in directions other than the Y axis which occurs due to this magnetic force is adjusted by the magnetic forces between the other electromagnets 75, 77, 79, 81, 87, 89 and 91 and driven body 1, and so the entire driven body 1 moves in the direction of the arrow sign $F_Y$ in the Figure.

Moreover, as shown in FIG. 16, when the currents flowing in electromagnets 83, 87 and 89 are increased and the currents flowing in the other electromagnets 75, 77, 79, 81, 85 and 91 are suitably increased or decreased, the magnetic force between electromagnets 83, 87 and 89 and driven body 1 is intensified. Movement in directions other than the $\theta_z$ axis which occurs due to this magnetic force is adjusted by the magnetic forces between the other electromagnets 75, 77, 79, 81, 85 and 91 and driven body 1, and so the entire driven body 1 rotates in the direction of the arrow sign $F_R$ in the Figure.

Furthermore, as shown in FIG. 17, when the currents flowing in electromagnets 75, 77, 79, 81, 83 and 85 are increased and the currents flowing in the other electromagnets 87, 89 and 91 are decreased, the magnetic force between electromagnets 75, 77, 79, 81, 83 and 85 and driven body 1 is intensified. Since the magnetic force between the other electromagnets 83, 89 and 91 and driven body 1 is weakened, the entire driven body 1 moves in the direction of the arrow sign $F_z$ in the Figure.

Thus, in the non-contact positioning device of this Embodiment, by using 9 electromagnets 75–91 and 9 position sensors $A_{75}$–$A_{91}$, the suspension of driven body 1 in any given position can be achieved. Therefore, a similar effect to that of Embodiment 1 can be expected.

Figure 18:
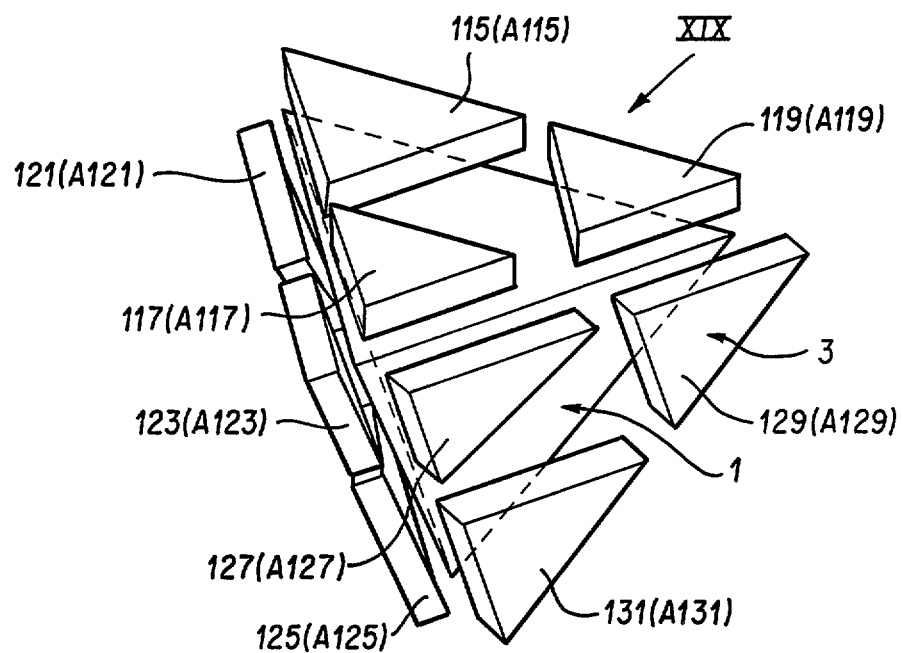
FIG. 18 is an overall oblique view showing the construction of the non-contact positioning device related to Embodiment 5 of this invention.
Figure 19:
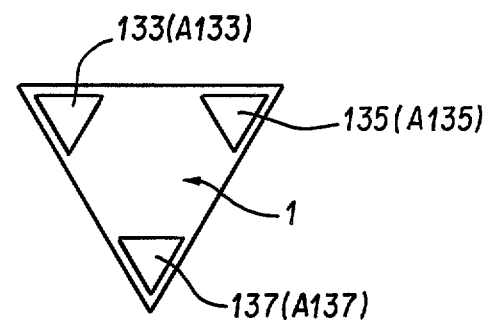
FIG. 19 is a view from arrow XIX in FIG. 18.

FIGS. 18 and 19 show Embodiment 5 of this invention. This Embodiment, as shown in FIG. 18, is composed of 12 electromagnets 115–137 and 12 position sensors $A_{115}$–$A_{137}$ fitted to driving body 3 which suspends and drives without contact driven body 1 which is formed as a tetrahedron and is the subject of positioning. Electromagnets 115–137 and position sensors $A_{115}$–$A_{137}$ are constructed in the same way as in Embodiment 1 and 3 each are arranged to correspond to each of the 4 faces of driven body 1.

Next, the action of Embodiment 5 is explained based on FIGS. 20–24.

Figure 20:
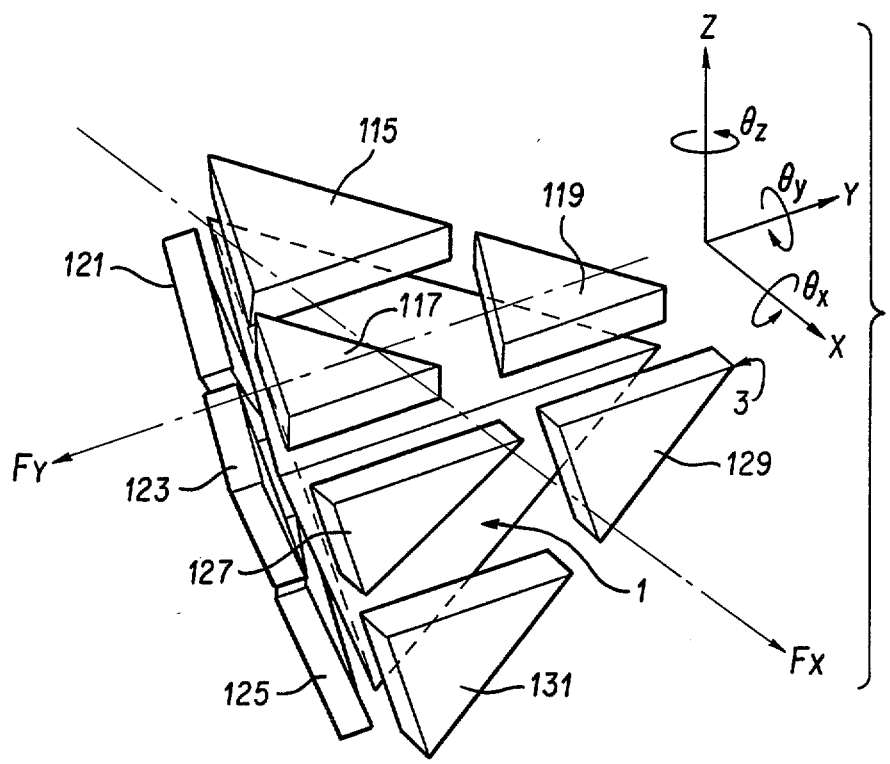
FIGS. 20–24 are illustrations of the operation of Embodiment 5.
Figure 21:
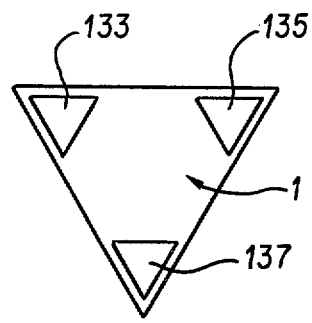

In FIGS. 20 and 21, when the currents flowing in electromagnets 127, 129 and 131 are increased by position adjustment system 31 and the currents flowing in the other electromagnets 115, 117, 119, 121, 123, 125, 133, 135 and 137 are suitably increased or decreased, the magnetic force between electromagnets 127, 129 and 131 and driven body 1 is intensified. Movement in directions other than the X axis which occurs due to this magnetic force is adjusted by the magnetic forces between the other electromagnets 115, 117, 119, 121, 123, 125, 133, 135 and 137 and driven body 1, and so the entire driven body 1 moves in the direction of the arrow sign $F_x$ in FIG. 20.

Similarly, in FIGS. 20 and 21, when the currents flowing in electromagnets 121, 123 and 125 are increased 31 and the currents flowing in the other electromagnets 115, 117, 119, 127, 129, 131, 133, 135 and 137 are suitably increased or decreased, the magnetic force between electromagnets 121, 123 and 125 and driven body 1 is intensified. Movement in directions other than the Y axis which occurs due to this magnetic force is adjusted by the magnetic forces between the other electromagnets 115, 117, 119, 127, 129, 131, 133, 135 and 137 and driven body 1, and so the entire driven body 1 moves in the direction of the arrow sign $F_Y$ in the FIG. 20.

Figure 22:
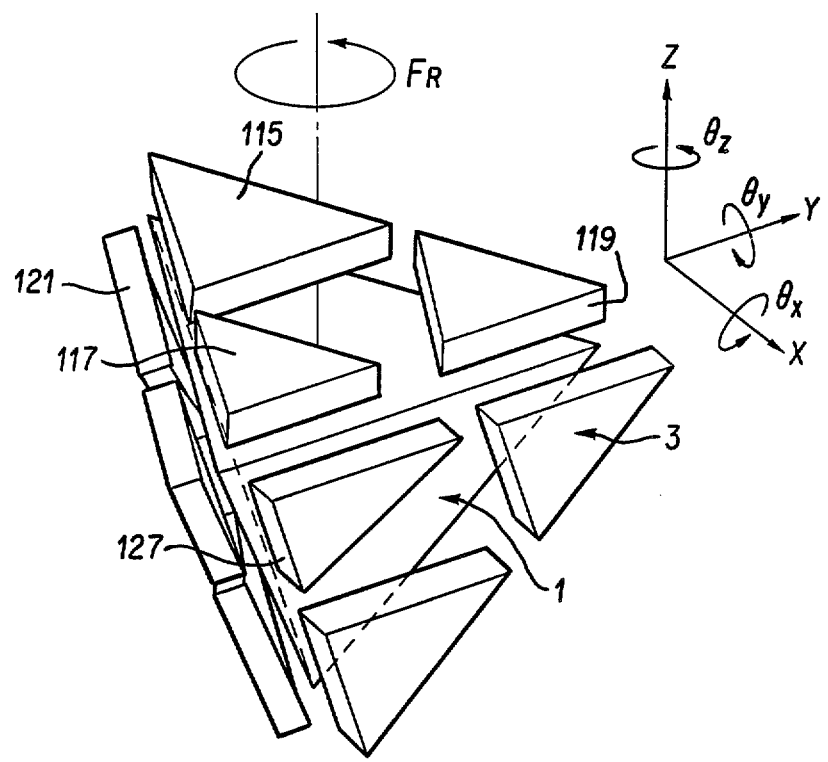
Figure 23:
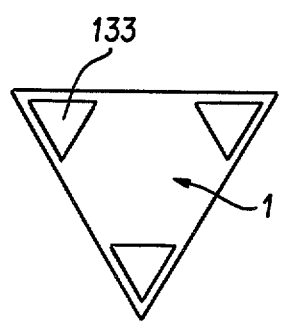

Moreover, as shown in FIGS. 22 and 23, when the currents flowing in electromagnets 121, 127 and 133 are increased and the currents flowing in the other electromagnets 115, 117, 119, 123, 125, 129, 131, 135 and 137 are suitably increased or decreased, the magnetic force between electromagnets 121, 127 and 133 and driven body 1 is intensified. Movement in directions other than the $\theta_z$ axis which occurs due to this magnetic force is adjusted by the magnetic forces between the other electromagnets 115, 117, 119, 123, 125, 129, 131, 135 and 137 and driven body 1, and so the entire driven body 1 rotates in the direction of the arrow sign $F_R$ in the FIG. 22.

Figure 24:
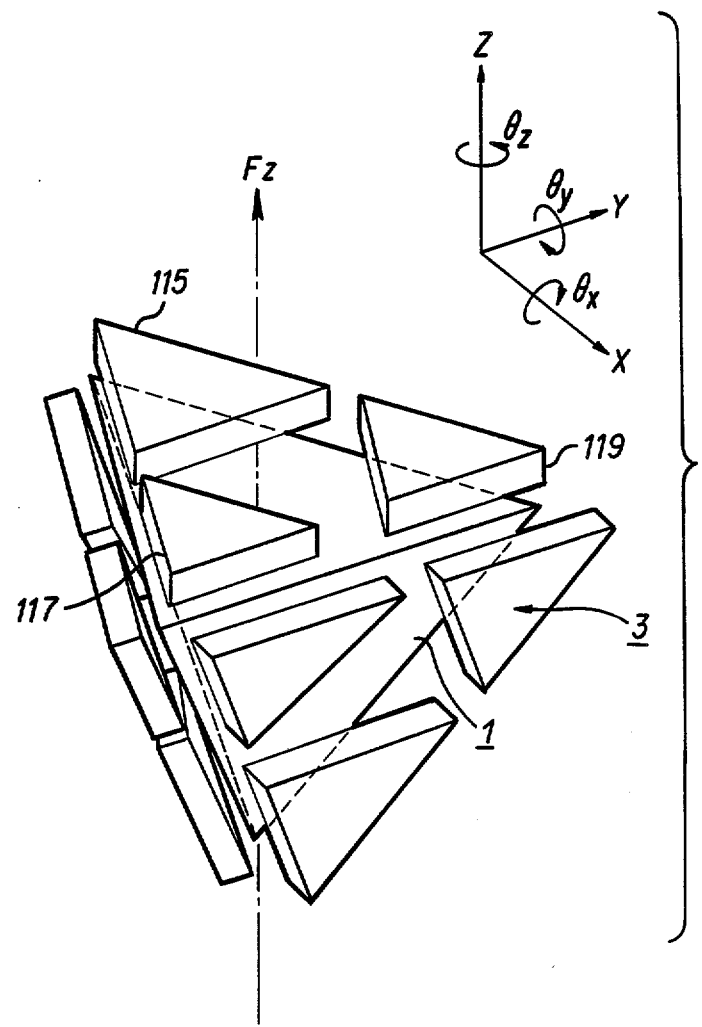

Furthermore, as shown in FIG. 24, when the currents flowing in electromagnets 115, 117 and 119 are increased and the currents flowing in the other electromagnets 121–137 are decreased, the magnetic force between electromagnets 115, 117 and 119 and driven body 1 is intensified. Since the magnetic force between the other electromagnets 121–137 and driven body 1 is weakened, the entire driven body 1 moves in the direction of the arrow sign $F_z$ in the Figure.

Therefore, in this Embodiment, driven body 1 can be suspended in any given position by 12 electromagnets 115–137 three of which are opposed to each face of the tetrahedron and 12 position sensors $A_{115}$–$A_{137}$. Moreover, since this Embodiment can be operated as in the Embodiments in FIGS. 1–4, even if some of the 12 electromagnets are out of action, this construction has a high degree of redundancy.

Figure 25:
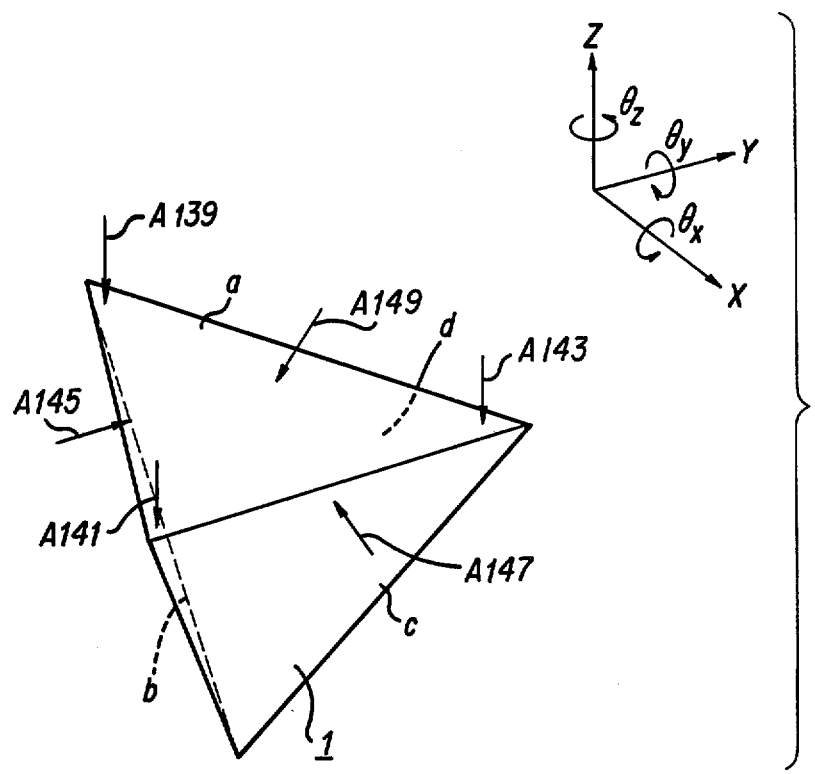
FIG. 25 is an overall oblique view showing the construction of the non-contact postioning device related to Embodiment 6 of this invention.

FIG. 25 relates to Embodiment 6 of this invention and it is a modification of Embodiment 5. In the construction of this Embodiment, the number of position sensors has been reduced to 6 as against that of Embodiment 5. That is to say, 3 position sensors $A_{139}$, $A_{141}$ and $A_{143}$ are arranged facing the 'a' face of driven body 1 and detect position on the Z axis, around the X axis and around the Y axis. The other 3 position sensors $A_{145}$, $A_{147}$ and $A_{149}$ are arranged facing the 'b' face, the 'c' face and the 'd' face of driven body 1 and are also arranged in the center of the edge adjacent to the 'a' face so that they detect position on the X axis, on the Y axis and around the Z axis.

This kind of construction is effective for other embodiments, and the number of position sensors can be minimised.

Moreover, in each of the above Embodiments, if the electromagnets limit the degrees-of-freedom of positioning of the driven body, they can be arranged to face a selected number of faces without arranging them to face all the faces of a simple polyhedron.

Figure 26:
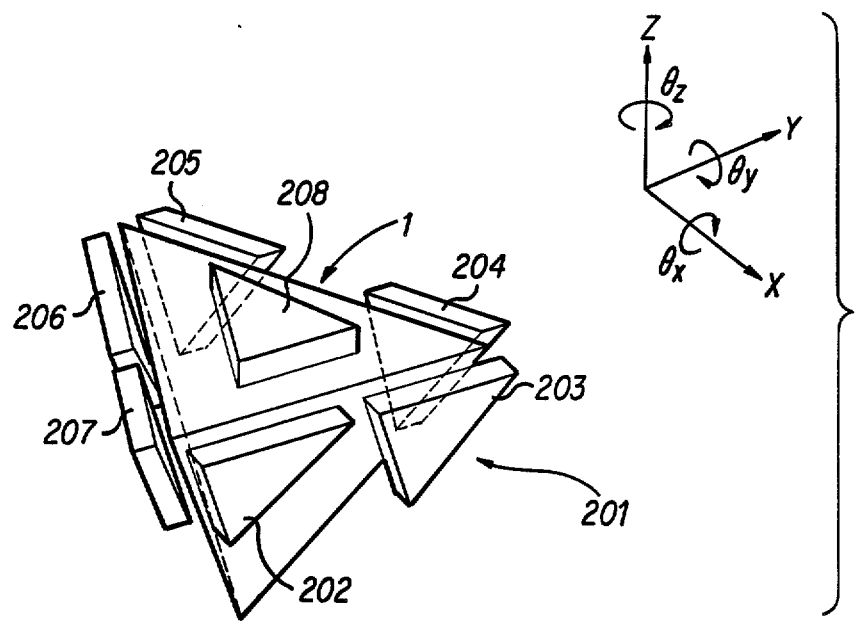
FIG. 26 is an overall oblique view showing the construction of the non-contact postioning device related to Embodiment 7 of this invention.
Figure 27:
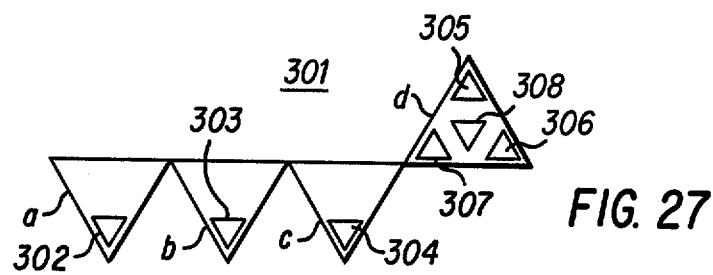
FIGS. 27 and 28 are an extended view showing the disposition of electromagnets related to other Embodiments for Embodiment 26 of this invention.
Figure 28:
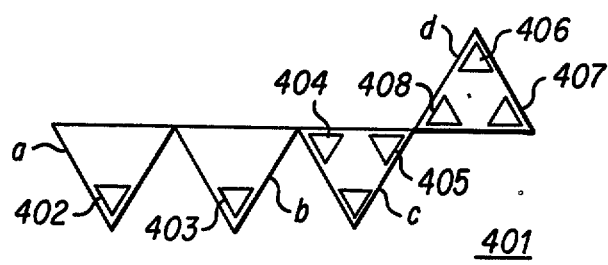

FIG. 26 shows a construction of Embodiment 1 related to this invention. In the construction of Embodiment 7, a non-contact positioning device is uses seven electromagnets such as shown as electromagnets 202, 203, 204, 205, 206, 207 and 208 which are provided on a driving unit 201 with a specified magnetic gap by the process of absorption force having magnetic attraction to driven body 1. Especially in this Embodiment, only one electromagnet 208 is provided on a upper surface of the driven body 1. This Embodiment can be operated the same as other Embodiments, since the driven body 1 can be driven and positioned for every directions of X, Y, Z, $\theta x$, $\theta y$ and $\theta z$ as shown in FIG. 26. Then, by this construction, the number of electromagnets can be minimised, and the number of position sensors which is shown in FIGS. 3 and 7 can be minimised too. The attached position of electromagnets can be replaced by other construction, for example, as shown in FIG. 27 and 28. These Figures are shown an extended view a disposition of electromagnets (driving units) 302, 303, 304, 305, 306, 307 and 308 in a driving means 301 and electromagnets (driving units) 402, 403, 404, 405, 406, 407 and 408 in a driving means 401 at each surface a, b, c and d of the polyhedron opposed to the driven body 1.

What is claimed is:

1. A non-contact positioning device for driving and positioning a subject fixed on a driven body which multiple axes comprising
    a driving body being formed in the shape of a polyhedron;
    a driving means disposed on at least four faces of said driving body polyhedron for suspending said driven body without contact; and
    driven body faces at least partially formed by said driven body opposite said driving body faces with said driven body faces having the same shape as said driving body faces, and positioning control means for adjusting a driving force of said driving means and for controlling the positioning of said driven body.

2. The non-contact positioning device according to claim 1 wherein said polyhedron is a right tetrahedron.

3. The non-contact positioning device according to claim 1 wherein said polyhedron is a right tetrahedron, and said driving means comprises eight driving units, two of which are opposed to each face of said tetrahedron.

4. The non-contact positioning device according to claim 1 wherein said driven body is formed as a shape of a right tetrahedron, and said driving means comprises twelve driving units, three of which are opposed to each face of said tetrahedron.

5. The non-contact positioning device according to claim 1 wherein said driven body is formed as a shape of a right tetrahedron, and said driving means comprises seven driving units, two driving units of which are opposed to each of three faces of said tetrahedron, and one driving unit of which is opposed to another face of said tetrahedron.

6. The non-contact positioning device according to claim 1 wherein said driven body is formed as a shape of a right tetrahedron, and said driving means comprises seven driving units, one driving unit of which is opposed to each of three faces of said tetrahedron, and four driving units of which are opposed to another face of said tetrahedron.

7. The non-contact positioning device according to claim 1 wherein said driven body is formed as a shape of a right tetrahedron, and said driving means comprises seven driving units, one driving unit of which is opposed to each of two faces of said tetrahedron, two driving units of which are opposed to another face of said tetrahedron and three driving units of which are opposed to another face of said tetrahedron.

8. The non-contact positioning device according to claim 1 wherein said driven body is formed as a shape of a right tetrahedron, and said driving means comprises nine driving units, each three driving units of which are opposed to each of three vertex portions of said tetrahedron.

9. The non-contact positioning device according to claim 1 wherein said driven body is constructed by an magnetic material, said driving means is comprised of an electromagnet which operates for positioning the driven body by an electromagnetic coupling.

10. The non-contact positioning device according to claim 1 wherein said positioning control means comprising;
    a position detecting means for detecting the distance between said driven body and said driving means and
    a position adjustment system for adjusting and for controlling a signal for adjusting said driving means.

11. The non-contact positioning device according to claim 10 wherein said position adjustment system comprising;
    a first vector computing element connected to position sensors;
    plural controllers connected to said first vector computing element;
    a second vector computing element for distributing signals from said plural controllers; and a signal amplifier for amplifying an output signal obtained from said second vector computing element.

12. The non-contact positioning device according to claim 10 said position adjustment system comprising:
a vector computing element connected to position sensors;
plural calculators connected to said vector computing element;
a controller connected to said plural calculators; and
a signal amplifier for amplifying said output signal obtained from said vector computing element.

13. The non-contact positioning device according to claim 1 wherein said driving means includes a plurality of driving units, each of said driving units being formed as a triangular prism.

14. The non-contact positioning device according to claim 1 wherein said driving means includes a plurality of driving units, with each of said driving units having the same shape.

15. The non-contact positioning device according to claim 14 wherein said driving units are formed as a triangular prism.

16. The non-contact positioning device according to claim 1 wherein said driven body is formed as a shape of a hollow right tetrahedron, and said driving means comprises nine driving units, two driving units of which are opposed to each of three faces of said tetrahedron and one driving unit of which is opposed to each of three hollow side faces of said tetrahedron.

17. The non-contact positioning device according to claim 1 wherein said driving means includes a plurality of driving units, with at least one of said driving units being located at a vertex of said polyhedron.

18. The non-contact positioning device according to claim 1 wherein said driving means includes a plurality of driving units, at least one of said driving units being located at a vertex of said polyhedron and arranged asymmetrically with respect to a perpendicular bisector of a face of said polyhedron.

* * * * *